US012682459B2

(12) United States Patent
Zheng et al.

(10) Patent No.: US 12,682,459 B2
(45) Date of Patent: Jul. 14, 2026

(54) IMAGE AND SEGMENTATION LABEL GENERATIVE MODEL FOR TREE-STRUCTURED DATA AND APPLICATION

(71) Applicant: ZHEJIANG UNIVERSITY, Hangzhou (CN)

(72) Inventors: Nenggan Zheng, Hangzhou (CN); Chao Liu, Hangzhou (CN); Deli Wang, Hangzhou (CN); Han Zhang, Hangzhou (CN); Zhaohui Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 244 days.

(21) Appl. No.: 18/364,471

(22) Filed: Aug. 2, 2023

(65) Prior Publication Data

US 2023/0377156 A1      Nov. 23, 2023

Related U.S. Application Data

(63) Continuation of application No. PCT/CN2022/131116, filed on Nov. 10, 2022.

(30) Foreign Application Priority Data

May 19, 2022     (CN) ......................... 202210556615.7

(51) Int. Cl.
*G06T 7/10*          (2017.01)
*G06T 5/70*          (2024.01)

(52) U.S. Cl.
CPC ................. *G06T 7/10* (2017.01); *G06T 5/70* (2024.01); *G06T 2207/20084* (2013.01)

(58) Field of Classification Search
CPC ................ G06T 7/10–194; G06T 5/70; G06T 2207/20084; G06V 10/26; G06V 10/82; G06V 10/695; G06V 20/70
See application file for complete search history.

(56) References Cited

U.S. PATENT DOCUMENTS

| | | | |
|---|---|---|---|
| 10,956,635 B1 * | 3/2021 | Douglas | .............. G06F 16/4393 |
| 2020/0175328 A1 * | 6/2020 | Bonakdar Sakhi | ... G06T 7/0014 |

(Continued)

FOREIGN PATENT DOCUMENTS

| | | |
|---|---|---|
| CN | 114494711 A | 5/2022 |
| CN | 114842149 A | 8/2022 |
| WO | 2022047625 A1 | 3/2022 |

OTHER PUBLICATIONS

Liu et al "Using Simulated Training Data of Voxel-Level Generative Models to Improve 3D Neuron Reconstruction" Jul. 14 (Year: 2022).*

(Continued)

*Primary Examiner* — Sean T Motsinger
(74) *Attorney, Agent, or Firm* — Wlersch Law Group

(57) ABSTRACT

Provided is an image and segmentation label generative model for tree-structured data and application. The model includes a simulation model for tree-structured image designed based on a small amount of expert knowledge and a generative network model based on morphological loss function. The present application can generate a simulated tree-structured image with labels that have a style highly similar to that of the real target image. This technology can generate image and segmentation labels for tree target in various medical images, such as brain neurons, retinal vessels, and trachea in the lungs, and the data quality can reach the level of manually annotated data. The model according to the present disclosure is the first model with the ability to automatically generate segmentation level data, (Continued)

Stage 1: Simulator for image;          Stage 2: Generative adversarial network and has the advantages of simple and flexible model configuration, high-quality generated data, and a wide range of applications.

7 Claims, 4 Drawing Sheets

(56)                 References Cited

U.S. PATENT DOCUMENTS

| | | | |
|---|---|---|---|
| 2020/0192389 A1* | 6/2020 | ReMine | G06V 20/58 |
| 2020/0401835 A1* | 12/2020 | Zhao | G06N 5/022 |
| 2021/0097691 A1* | 4/2021 | Liu | G06V 10/764 |
| 2021/0133961 A1* | 5/2021 | Itu | G06N 20/00 |
| 2021/0183142 A1* | 6/2021 | Lee | G06T 17/05 |
| 2021/0303925 A1* | 9/2021 | Hofmann | G06V 20/56 |
| 2022/0092786 A1* | 3/2022 | Xu | G06V 10/82 |
| 2022/0180527 A1* | 6/2022 | Hagi | A61C 7/002 |
| 2022/0208355 A1* | 6/2022 | Li | G06N 3/09 |
| 2022/0230303 A1* | 7/2022 | Karaoglu | A61B 34/20 |
| 2023/0377156 A1* | 11/2023 | Zheng | G06T 5/70 |

OTHER PUBLICATIONS

International Search Report (PCT/CN2022/131116); Date of Mailing: Jan. 20, 2023.

\* cited by examiner

Neuron simulation image      Segmentation label of neuron simulation

IMAGE AND SEGMENTATION LABEL GENERATIVE MODEL FOR TREE-STRUCTURED DATA AND APPLICATION

CROSS-REFERENCE TO RELATED APPLICATIONS

The present application is a continuation of International Application No. PCT/CN2022/131116, filed on Nov. 10, 2022, which claims priority to Chinese Application No. 202210556615.7, filed on May 19, 2022, the contents of both of which are incorporated herein by reference in their entireties.

TECHNICAL FIELD

The present disclosure relates to the technical field of biomedical engineering and in particular, to an image and segmentation label generative model for tree-structured data and application. Without any manually annotated information, a simulated image with a label that are highly similar to the real tree-structured image can be generated. This technology is a highly potential to solve the problem that neural networks rely on high-quality annotated data, which can be applied to various scenarios such as brain neurons, retinal vessels, and trachea in the lungs, and thereby has extremely broad practical value.

BACKGROUND

The basic form of a tree structure can be represented as a hierarchical nested structure with morphological features of multi-level branch point and three-dimensional stretching. From a root node, it grows in a smooth direction to form a branch point. At the branching node of each layer, the branch point splits once and continues to grow, thus a multi-level tree structure is formed. In biomedical image processing, segmentation of a tree-structured image has a wide range of application scenarios, such as brain neuron reconstruction, retinal vessel segmentation, and trachea segmentation in the lungs.

Data-driven deep neural network is a model that can segment the tree-structured image with high accuracy. A large amount of high-quality expert annotated data is required as training data to achieve a deep network with strong robustness. However, it cost an extremely large amount of time and labor to annotate the tree-structured image, in particularly the 3D image. Different biologists may overlook some weak structures when analyzing a branch image. Moreover, it is difficult for annotators to distinguish between foreground branch signals and background noise in areas where the foreground branch signals are submerged in the background noise due to the limitations of microscope imaging ability.

In order to reduce the difficulty of obtaining annotated data and enable deep learning as a powerful model, to be applied to such tree-structured image, it is desired to use computer simulation to generate annotated data with similar features as the real image to replace the tedious manual annotation work.

Methods based on computer simulation include two main categories: a model-based method and a learning-based method.

Model-based method is used to model the entire imaging process. In order to make the simulated image more realistic, it is necessary to carefully consider many details, including the length of the branch, the radius of the branch, the pixel intensity (or color) of the image, imaging features, noise, etc., even if some parameters need to be understood or counted in details from the real image. It cost an extremely large amount of time and labor to simulate the image with this method, and whenever the condition of the image changes, the parameters must be adjusted by experts.

Learning-based method is used to generate visually realistic images using emerging deep learning technology. This method learns features from the real images through a generative adversarial network. A generative adversarial model mainly includes two deep neural networks: a generator and a discriminator. The input of the generator is random data, which aims at learning relevant knowledge as much as possible form real data, and the output thereof is. The input of the discriminator includes two types: the generated image of the generator and the real image, which aims at distinguishing the real image from the refined image as much as possible. In each iteration of the model, the generator is to generate the image as similar as possible to the real image, thereby "deceiving" the discriminator, and the discriminator distinguishes the real image from the refined image as much as possible. The style of the simulated image is adjusted to make the simulated image realistic enough. However, none of the simulated images generated by the method provide pixel or voxel level labels, which limits their application in the segmentation task.

SUMMARY

In view of the above problem that the segmentation task for the tree image lacks high-quality training data, the present disclosure provides an image and segmentation label generative model for tree-structured data, which is a generative model for tree-structured image and segmentation label. The model includes two modules: a first module which is a simulation model for tree-structured image designed based on a small amount of expert knowledge, configured to generate a coarse-grained tree-structured image, and a second module which is a generative network model based on morphological loss function, configured to learn the style of a real tree-structured image and adjust the details of a simulated image. Through the generative model, which includes two modules, for the tree-structured image, a large number of high-quality segmentation level training data with labels are automatically generated to completely solve the bottleneck of the lack of training data for deep learning.

In order to achieve the above purpose, the image and segmentation label generative model for tree-structured data according to the present disclosure includes the following two modules:

(1) The simulation model $M_\gamma$ for tree-structured image designed based on a small amount of expert knowledge is configured to construct the simulation model and generate tree-structured simulated image and the corresponding segmentation label thereof by summarizing the prior knowledge of the real image. The prior knowledge of the tree image includes features such as morphologies of the tree (bifurcations of a branch, the thickness of the branch, and the length of the branch), histograms of pixel or voxel intensity, background noise, and blurring effect of the branch.

(2) The generative network model based on morphological loss function is configured to keep under the condition that the underlying segmentation label of the image remains unchanged, learn the style and morphological features of the real image, and adjust detail textures and the overall pixel or voxel distribution style of the simulated image.

In an embodiment, constructing the simulation model $M_\gamma$ for the image in the step (1) is specifically as follows:

(1-1) The simulation model $M_\gamma$ for the tree-structured image is constructed by summarizing internal and external features of the tree-structured image. The internal features refer to geometric features of the branch in the image, including five branch geometric features: the depth T of the tree, the bifurcation degree B of the branch, the radius R of the branch, the length L of the branch, and the direction θ of the branch. The external features refer to texture features of the image, the intensity distribution of the branch and the noise distribution.

(1-2) The internal features of the simulation model $M_\gamma$ for the tree-structured image are configured to simulate the shape of the tree, where a series of nodes with different radii are used to simulate a typical tree data structure:

$$n_i = (x_i, y_i, z_i, r_i, n_j) \mid i = 1, \ldots, N, j = 0, \ldots, N, i \neq j, x_i, y_i, z_i, r_i \in \mathbb{R}$$

where $n_i$ is a single node, the position thereof is $p_i = (x_i, y_i, z_i)$, the radius thereof is $r_i$, the node $n_j$ is the parent node of the node $n_i$, and node $n_0$ is a root node. Based on the data structure, it is necessary for each node $n_i$ to specify the radius R thereof, the length L of the branch, the angle θ of the branch, the bifurcation degree B of the branch, and the depth T of the tree.

The depth T of the tree refers to the number of bifurcations of the tree starting from the root node, which is obtained according to a uniform distribution $U(T_{min}, T_{max})$, and the probability density thereof is:

$$f(t) = \begin{cases} \dfrac{1}{T_{max} - T_{min}}, & T_{min} < t < T_{max} \\ 0, & \text{other} \end{cases}$$

where $T_{max}$ and $T_{min}$ are the maximum and minimum depths of the tree, respectively.

The bifurcation degree B of the branch refers to the number of bifurcation sub-branches at a bifurcation point, which is obtained based on exponential distribution:

$$f(b) = \begin{cases} \dfrac{1}{\alpha} e^{-b/\alpha}, & b > 0 \\ 0, & \text{other} \end{cases}$$

where α is 1.

The radius R of the node on each branch is obtained based on uniform distribution $U(R_{min}, R_{max})$, and the radius of the branch decreases at a rate of $\delta_r$ at the depth of each layer of the tree:

$$f(r) = \begin{cases} \dfrac{1}{R_{max} - R_{min}}, & R_{min} < r < R_{max} \\ 0, & \text{other} \end{cases}$$

$$R = R_0 \cdot \delta_r^T$$

where $R_{max}$, and $R_{min}$ are the maximum and minimum radii of the branch, respectively. The decay rate of the radius of the branch is $\delta_r$. In an embodiment, the proportion of finer branches can be appropriately increased to increase the proportion of branches with weaker signals in the distribution of the generated data.

The length L of the branch is obtained based on uniform distribution $U(L/2, 3L/2)$, and the length of the branch decreases at a rate of $\delta_l$ at the depth of each layer of the tree.

$$f(l) = \begin{cases} \dfrac{1}{3L/2 - L/2}, & \dfrac{L}{2} < r < \dfrac{3L}{2} \\ 0, & \text{other} \end{cases}$$

$$L = L_0 \cdot \delta_l^T$$

where $L_0$ represents the average length of branches obtained based on statistics, and $\delta_l$ represents the decay rate of the length of the branch.

The directions of the sub-branches are determined based on the direction of the parent branch thereof, and are rotated sequentially along Z and Y axes, with rotation angles $\theta_z$ and $\theta_y$, respectively. The angle $\theta_y$ is obtained based on uniform distribution $U(\pi/4, \pi/2)$, such that the directions of the sub-branches are approximately the same as that of the parent branch:

$$f(\theta) = \begin{cases} \dfrac{1}{\pi/2 - \pi/4}, & \dfrac{\pi}{4} < \theta < \dfrac{\pi}{2} \\ 0, & \text{other} \end{cases}$$

The angle $\theta_z$ is obtained based on arithmetic progression:

$$\theta_z = \left\{ \dfrac{k\pi}{B} \mid k = 1, \ldots, B \right\}$$

where B is the bifurcation degree of the branch, such that the sub-branches are evenly distributed around the central axis.

The topological morphology of the tree-structured image is modeled by representing the above features of the tree branch.

(1-3) The external features of the simulation model $M_\gamma$ for tree-structured image are configured to model texture features of the image, intensity distribution of the branch and noise distribution. In the tree-structured image, a foreground is set as a branch signal, and a background is set as noise other than the branch. The features related to the external features include the intensity distributions of the foreground and background, blurring effect and noise mode in the imaging process.

In the image, the pixel or voxel intensity $M_f$ and background part $M_b$ of the branch in the tree structure are simulated based on normal distribution $M_f \sim N(\mu_f, \sigma_f)$ and $M_b \sim N(\mu_b, \sigma_b)$, respectively:

$$f(m_f) = \frac{1}{\sqrt{2\pi}\,\sigma_f} e^{-\frac{(m_f - \mu_f)^2}{2\sigma_f^2}}$$

$$f(m_b) = \frac{1}{\sqrt{2\pi}\,\sigma_b} e^{-\frac{(m_b - \mu_b)^2}{2\sigma_b^2}}$$

where $\mu_f$ and $\sigma_f$ are the mean and variance of the foreground, respectively, $\mu_b$ and $\sigma_b$ are the mean and variance of the background, respectively.

In addition, the branch in the foreground of the image are subject to a blur process using Gaussian kernel to simulate the effect of microscope imaging. Meanwhile, circular spots with random sizes are added at random positions in the background to simulate common spotted noise signals in the image.

In an embodiment, the generator based on the adversarial network in the step (2) is specifically as follows:

(2-1) The generative network model, based on morphological loss function, of the second module learns relevant features from complex real tree image data using the generative adversarial network, and adjust the style of the simulated image generated by the model of the first module, such that the simulated image has the features of the real image while maintaining the original underlying segmentation label. In the generative model, a simulated image z from the simulation model $M_\gamma$ is input to a refiner to generate a refined image $R(z)$. Then, a real image x and the refined image $R(z)$ are fed into a discriminator, which learns to distinguish between the real image and the refined image. The discriminator and the refiner can be optimized by the following formula:

$$\min_D \left[ \mathbb{E}_{x \sim p_{real}}(D(x) - 1)^2 + \mathbb{E}_{z \sim p_{sim}}(D(R(z)))^2 \right]$$

$$\min_R \left[ \mathbb{E}_{z \sim p_{sim}}(D(R(z)) - 1)^2 + \mathbb{E}_{z \sim p_{sim}} \mathcal{L}_c(z, R(z)) \right]$$

where x is sourced from a real image distribution $p_{real}$, z is sourced from a simulated image distribution $p_{sim}$ in the first stage; and where objective functions of the refiner includes two items: one is an adversarial objective function for the refiner to learn the style of the real image, and the other is $\mathcal{L}_c$ that controls the change of the segmentation label of the input image.

(2-2) The mapping between the distributions of the simulated image and the real image can be learned through adversarial learning. However, during the process of solving this mapping, the neural network is prone to produce the problem of unstable training, and adjusting the network often overemphasizes certain image features to "deceive" the current discriminator, thereby resulting in image drift and complete blackening. In addition, when performing adjustments through the refiner, the underlying segmentation label often undergo significant deformation. In an embodiment, the radius of the branch of the tree may change, which can cause the branch of the adjusted image to become thinner or thicker, thereby resulting in a mismatch with the original segmentation labels thereof. Therefore, during the training process, the external data features of the image are added to control the similarity between the overall distribution of the refined image and the simulated image:

$$\mathcal{L}_c(z, R(z)) = \alpha \mathcal{L}_{sim}(z, R(z)) + \beta \mathcal{L}_{mp}(z, R(z))$$

where z is the simulated image, $R(z)$ is the image generated by the refiner, $\mathcal{L}_{sim}$ is an image similarity loss designed for the external features of the image, $\mathcal{L}_{mp}$ is a morphology preserving loss of the image designed for the internal features of the image, and $\alpha$ and $\beta$ are hyperparameters for balancing each loss function.

The image similarity loss is a commonly used loss function in the current unsupervised generative learning model, the purpose of which is to control the stability of the generative model in training and avoid the model falling into a single mapping mode. The data similarity loss is as follows:

$$\mathcal{L}_{mp}(z, R(z)) = \|z - R(z)\|_1$$

where $\|\bullet\|_1$ is L1 regularization term.

The morphology preserving loss $\mathcal{L}_{mp}$ may maintain the underlying segmentation label unchanged during the style transfer process of the model by the refiner, and the morphology preserving loss $\mathcal{L}_{mp}$ is defined as:

$$\mathcal{L}_{mp}(z, R(z)) = \frac{|z_F \cup R(z)_F| - |z_F \cap R(z)_F|}{|z_F \cup R(z)_F|}$$

where $z_F$ represents the foreground of the simulated image, $R(z)_F$ represents the foreground of the generated image, namely the branch in the image, and $\mathcal{L}_{mp}$ measures the difference in voxel values between the foregrounds of the simulated image and the generated image.

$|z_F \cup R(z)_F|$ and $|z_F \cap R(z)_F|$ are calculated by using the following two formulas:

$$|z_F \cup R(z)_F| \approx \frac{1}{2N} \sum_i^N [g(z_i) + g(R(z)_i) + |g(z_i) - g(R(z)_i)|]$$

$$|z_F \cap R(z)_F| \approx \frac{1}{2N} \sum_i^N [g(z_i) + g(R(z)_i) - |g(z_i) - g(R(z)_i)|]$$

where $$g(x) = \frac{1}{1 + e^{-K(x-\mu)}}$$

where K is a value for clearly distinguishing the foreground and background of the image, and $\mu$ is a threshold of the foreground and background, which can be automatically and statistically obtained based on the predefined segmentation label of the image:

$$\mu = \min\left\{ T \middle| \int_0^T p_b(x)dx \geq 0.95 \right\}$$

where $p_b(x)$ is the background distribution of the image.

When $z_F$ and $R(z)_F$ are both foregrounds, $|z_F \cap R(z)_F|$ tends to 1, and otherwise tends to 0. Similarly, when $z_F$ or $R(z)_F$ is the foreground, $|z_F \cap R(z)_F|$ tends to 1, and otherwise tends to 0. By using this differentiable function, the neural network may be computable during back propagation. Through this item, the image can be controlled to maintain the distributions of the foreground and background even after passing through the refiner.

So far, the construction of the image and segmentation label generative model for tree-structured data has been completed.

The present disclosure further provides an application of the system architecture of the model in various medical image segmentation tasks which include tree structure, for example, 2D or 3D medical image segmentation tasks such as neuron segmentation, trachea segmentation, and retinal vessel segmentation. The generative model according to the present disclosure can automatically generate the tree-structured simulated image and the corresponding segmentation label thereof, which are very similar to the various medical tree-structured images mentioned above, so as to replace the costly and time-consuming process of manually annotating data. The generated data with labels can be directly used to train the segmentation network of the corresponding image and solve various image segmentation problems.

The application of the simulation model for tree-structured image of the first module needs to count the required statistics prior knowledge for the features of different images, specifically including the internal features of the image (the depth of the tree, the bifurcation degree of the branch, the radius of the branch, the length of the branch, and the direction of the branch) and the external features of the image (the intensity distributions of the foreground and background, the noise features, and the blurring effect). The statistical information based on the above features are the expert knowledge required to construct the simulation model.

The application of the generative network model based on the morphological loss function of the second module needs to construct an end-to-end generative adversarial network, which can realize the style transfer of the simulated image by learning the pixel or voxel distribution features of the target in the real tree image. In particular, the morphological loss function is used in the network training process to maintain the underlying segmentation labels of the image unchanged.

The model according to the present disclosure is the first model capable of automatically generating a tree-structured image and a segmentation label, and has the advantages of simple and flexible model configuration, high-quality generated data, and a wide range of applications. The model can be used to replace the costly and time-consuming process of manually annotating data, and may completely solve the bottleneck of the lack of annotated data for deep learning when dealing with the segmentation problem of medical tree image, with great practical application potential.

DESCRIPTION OF EMBODIMENTS

In order to provide a clear understanding of the embodiments of the present disclosure, further explanations will be provided below in conjunction with the drawings and specific implementation.

Example 1

In this Example, a brain neuron image of mice was selected as an application scenario example. Neuron morphology reconstruction is regarded as one of the core steps in understanding the working principles of the biological brain and revealing the mechanisms of life operation. An important sub-task of a neuron reconstruction algorithm is to segment a three-dimensional image of neurons to separate the foreground of neurons with high intensity values from the noise background with low intensity values in the image.

However, annotating such three-dimensional neuron images is extremely time-consuming and labor-intensive. Different neuroscientists may overlook some weak branch structures when analyzing an image. Moreover, it is difficult for annotators to distinguish between foreground neuron signals and background noise in areas where the foreground branch signals are submerged in the background noise due to the limitations of optical microscope imaging ability.

Figure 1:
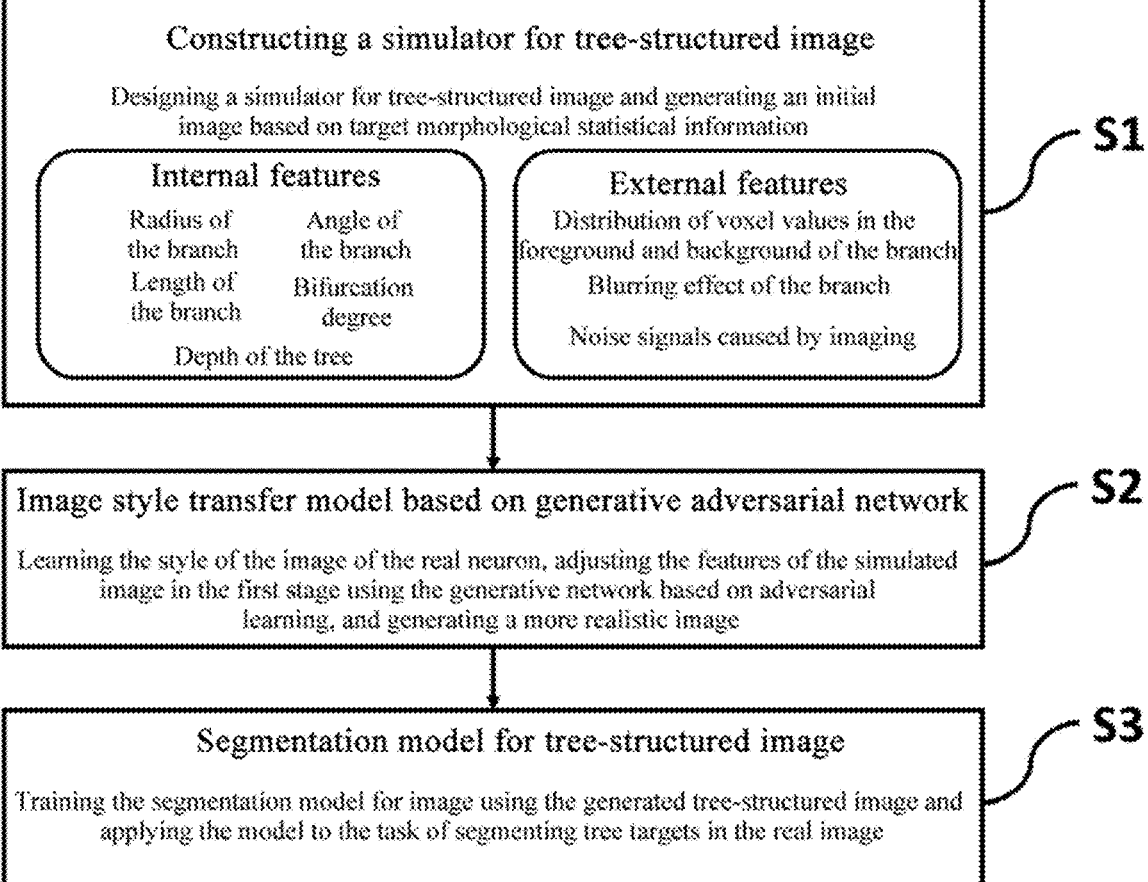
FIG. 1 is a schematic diagram of a two-stage generative model architecture for tree image.

In order to reduce the difficulty of obtaining annotated data and enable deep learning, as a powerful model, to be applied to the neuron reconstruction task, an image simulation method based on two-stage generative model according to the present disclosure can be used to automatically generate high-quality image data with a segmentation label and solve the bottleneck of the lack of training data for deep learning in the neuron reconstruction task. The model architecture diagram is shown in FIG. 1.

Figure 2:
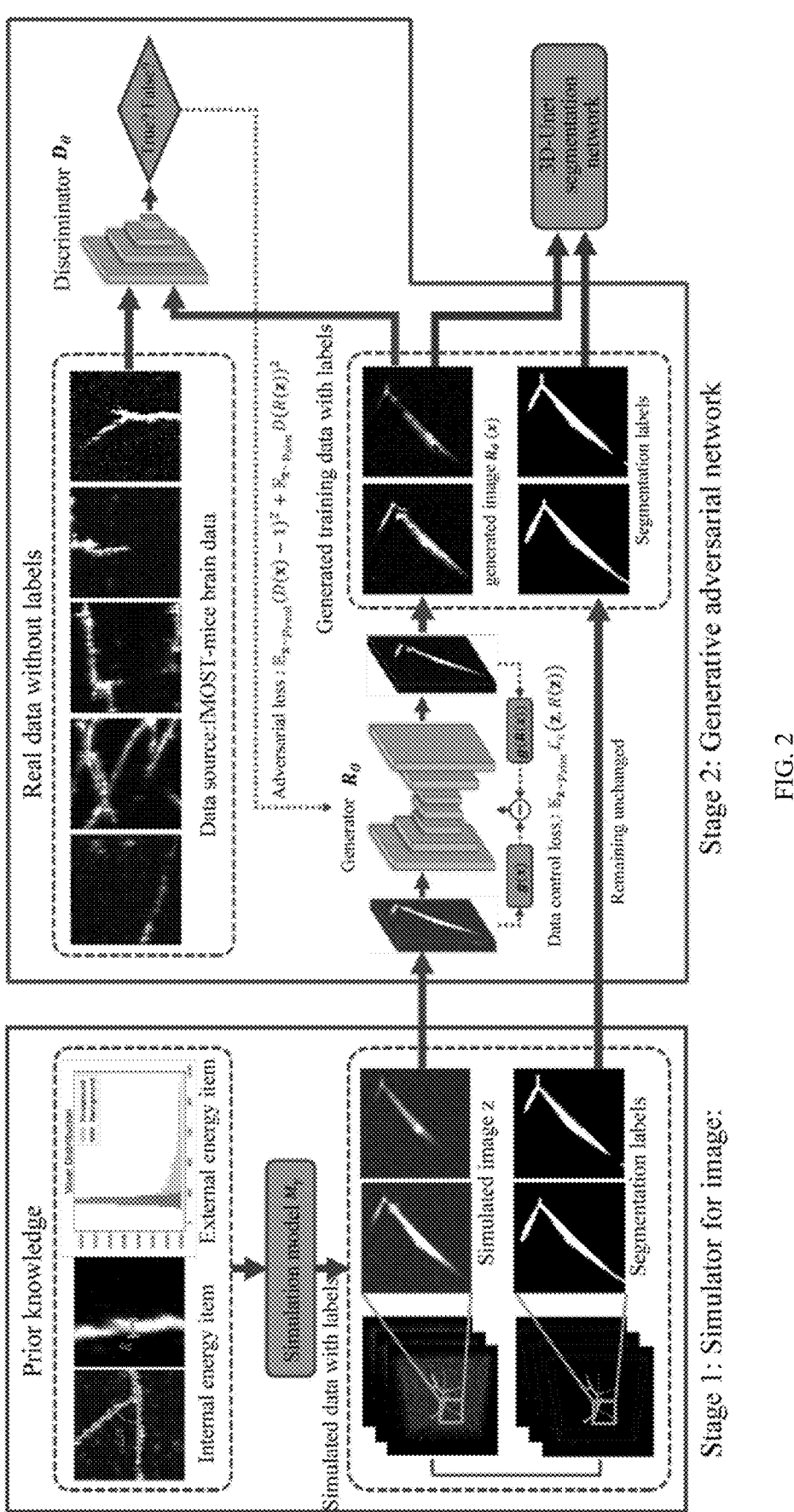
FIG. 2 is a flowchart of a two-stage generative model for tree image.
Figure 3:
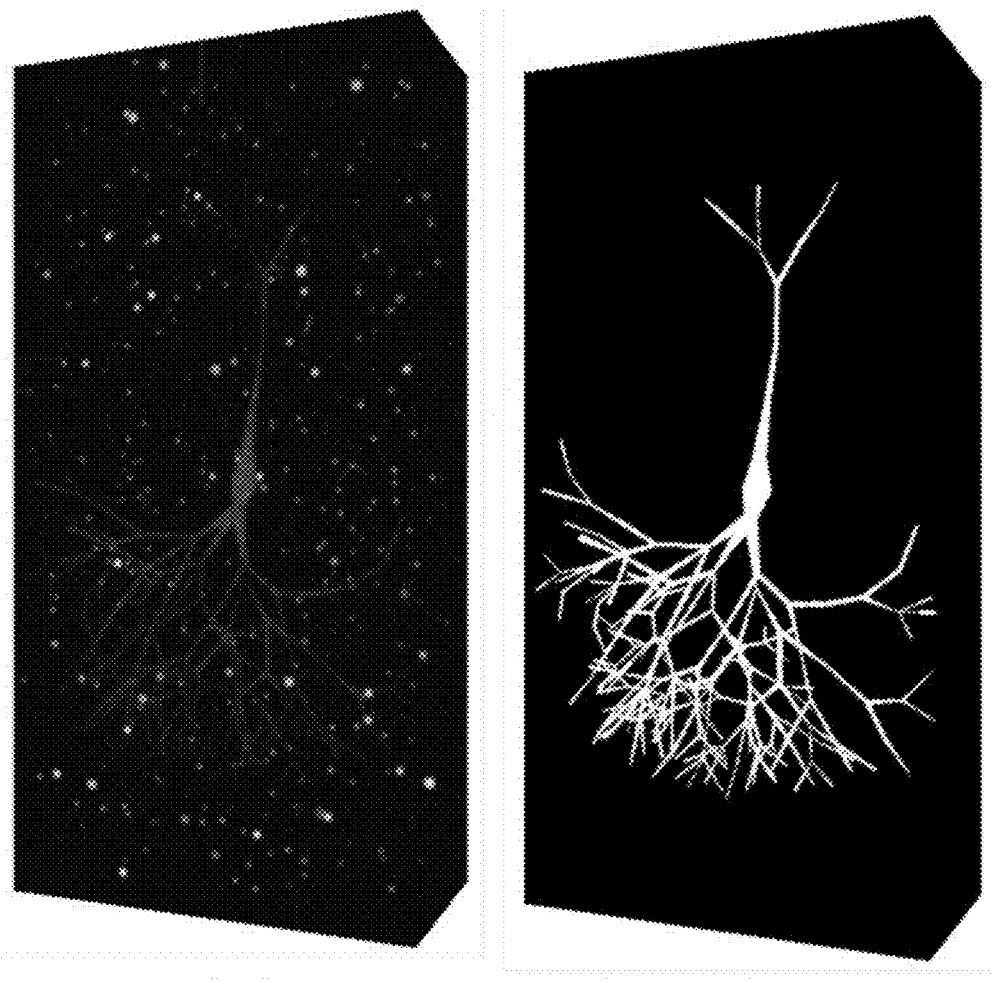
FIG. 3 shows a neuron image and corresponding labels generated by a simulation model in the first stage.

As shown in FIG. 2, the process of generating tree-structured data according to the present disclosure is as follows:

Step A: a simulation model for neuron tree image is constructed. Based on prior knowledge of neuron morphology, such as the radius of the branch, the length of the branch, the angle of the branch, bifurcation degree, and the depth of the neuron tree, and a simulation model for an initial neuron image is designed. Users need to count and input the above prior knowledge based on real neuron image. When constructing the simulation model for the tree-structured image, the specific parameters are set as follows: the depths $T_{min}$ and $T_{max}$ of the tree are set to be 5 and 8, respectively; the radii $R_{min}$ and $R_{max}$ of the node are set to be 2 and 4, respectively; the decay rate $\delta_r$ of the radius of the branch is set to be 0.9; the length L of the branch is set to be 50; the decay rate $\delta_l$ of the length of the branch is set to be 0.9; when generating an image of 8-bit, the mean value $\mu_f$ and the variance $\sigma_f$ of the foreground are set to be 200 and 10, respectively, the mean value $\mu_b$ and the variance $\sigma_b$ of the background are set to be 20 and 5, respectively; when generating an image of 16-bit, the mean value $\mu_f$ and the variance $\sigma_f$ of the foreground are set to be 1000 and 50, respectively, the mean value $\mu_b$ and the variance $\sigma_b$ of the background are set to be 20 and 5, respectively. In addition, the simulation model for the neuron image supports multi-process parallel computing and can quickly generate a large amount of simulated data, including simulated neuron images (8-bit or 16-bit) and the corresponding segmentation labels (0-1) thereof, as shown in FIG. 3.

Step B: the training data for generative network is segmented. Due to the large size of the 3D neuron image, the model will be huge and difficult to train if the image is directly input into the deep network. Therefore, the model according to the present disclosure adopts the form of segmenting neuron into small blocks, each with a size of 64×64×32. The specific implementation method is to use a sliding window to select positions on the neuron image by sliding. When the window includes areas with high branch strength, the image block is segmented as a training image.

Figure 4:
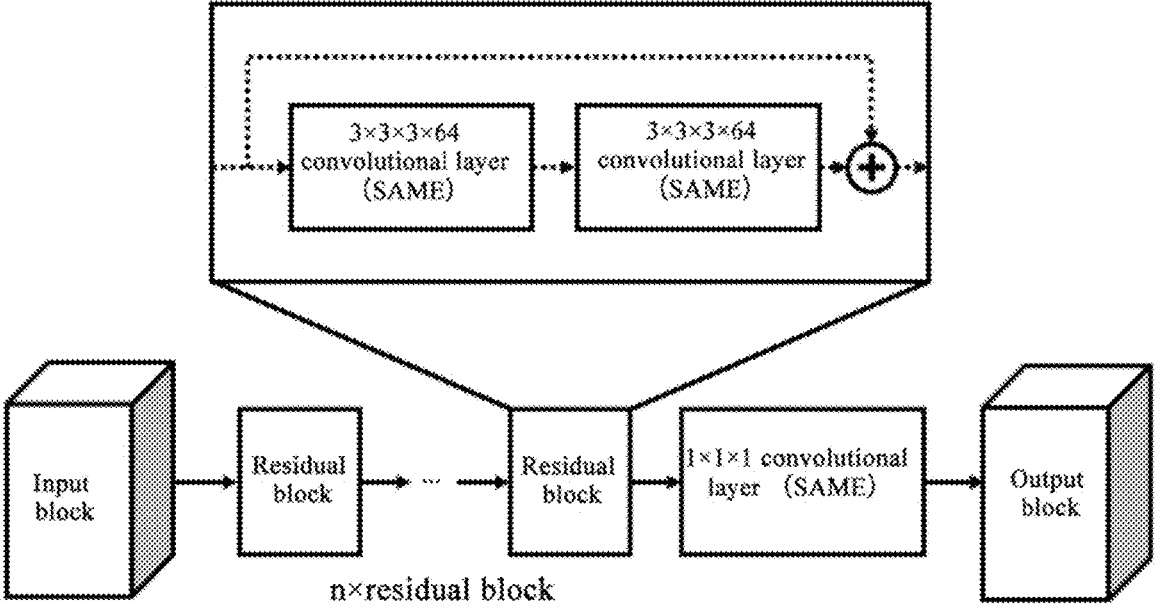
FIG. 4 is a network architecture of a generative model in the second stage.

Step C: a generative adversarial network based on morphological loss function is constructed. In the second stage, a model based on generative adversarial network is adopted, including a refiner and a discriminator. The image z in the first stage is input into the refiner including n residual modules, and the adjusted image R(z) is output. Then, the generated image R(z) and the real image are input into the discriminator. The discriminator will try to distinguish the generated image from the real image as much as possible, and pass a gradient back to the refiner, such that the refiner will generate an image as similar as possible to the real image in the next generation, thereby making it impossible for the discriminator to distinguish. The network architecture of the refiner is shown in FIG. 4. Through the confrontation between two networks, the style of the generated image becomes similar to that of the real image. Once the model loss value tends to be stable, the training will be stopped. The simulated image in the first stage is input using the trained refiner, and the final generated image is output.

In order to verify the reliability of the generative model according to the present disclosure, the quality of the data generated by the model is analyzed. The following shows the effects of the data generated from the ablation experiment with the two-stage model to verify the effectiveness of each stage of the model.

The ablation experiment with the two-stage model includes four control groups:

Experiment 1: the simulation model of module 1 (internal features) configured only to generate a neuron image with tree topology structure.

Experiment 2: the simulation model of module 1 (internal features) and the generative network of module 2 configured to first generate, based on Experiment 1, the neuron image with tree topology structure was generated, and then adjust the image details using the generative network.

Experiment 3: the simulation model of module 1 (internal features and external features) configured to generate a neuron image with tree topology structure, and added rendering of the external features of the image for foreground, background, and noise.

Experiment 4: the simulation model of module 1 (internal features and external features) and the generative network of module 2 configured to generate, based on Experiment 3, the simulated image with both internal features and external features of the neuron image, and then adjust the image details using the generative network.

Figure 5:
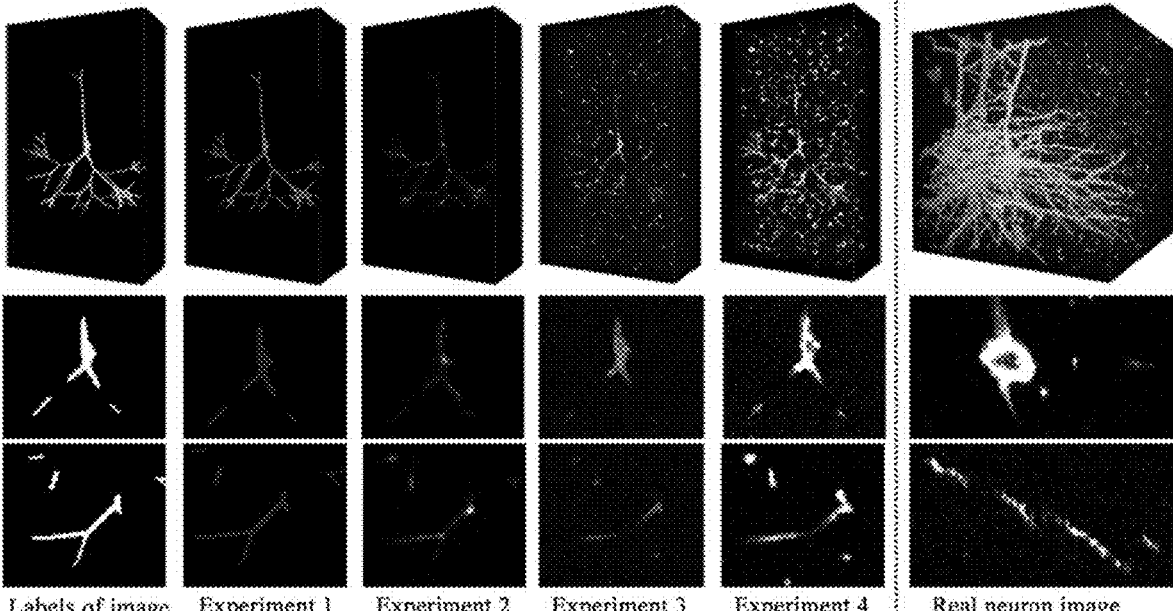
FIG. 5 shows the comparison between a real neuron image and an ablation experiment of a generative model for a neuron tree image.

The results of the ablation experiment are shown in FIG. 5. Experiment 1 adopts the simulation model for neural image that only combines the internal features of the image, and the generated image has morphological features of the neuron, but the foreground and background of the image are constant values. Based on Experiment 1, Experiment 2 adopts the simulation model combined with the generative network model in the second stage, and a significant blurring effect can be observed in the branch, but the foreground and background thereof do not possess the features of the real neuron image. Experiment 3 adopts the simulation model for neural image combining the internal and external features of the image, which possesses the basic morphology and the basic pixel or voxel intensity features of the real neuron, but the texture details thereof are still not realistic enough. The style of the image of the model in Experiment 4 is most similar to that of the real image.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The steps of the method or algorithm described combined with the embodiments of the present disclosure may be implemented in a hardware manner, or may be implemented in a manner in which a processor executes software instructions. The software instructions may consist of corresponding software modules, and the software modules can be stored in Random Access Memory (RAM), flash memory, Read Only Memory (ROM), Erasable Programmable ROM (EPROM), Electrically Erasable Programmable Read-Only Memory (EEPROM), registers, hard disks, removable hard disks, CD-ROMs or any other forms of storage media well-known in the art. An exemplary storage medium is coupled to the processor, such that the processor can read information from, and write information to, the storage medium. The storage medium can also be an integral part of the processor. The processor and storage medium may reside in an Application Specific Integrated Circuit (ASIC). Alternatively, the ASIC may be located in a node device, such as the processing node described above. In addition, the processor and storage medium may also exist in the node device as discrete components.

In addition, the simulation model for tree-structured image in the first stage can be designed separately for various types of images. The present disclosure can be conveniently and quickly applied to the task of generating data, with labels, of 2D or 3D medical images, including neuron image reconstruction, trachea segmentation, retinal vessel segmentation, and the like. Any amendment, equivalent replacement, or improvement made within the spirit and principles of the present disclosure shall be fall within the protection scope of the present disclosure.

What is claimed is:

1. An image and segmentation label generative model for two-stage tree-structured data, comprising:

a first module comprising a simulation model $M_\gamma$ for a tree-structured image designed based on a small amount of expert knowledge configured to generate a coarse-grained tree-structured image; and a second module comprising a generative network model based on a morphological loss function configured to learn a style of a real tree-structured image and adjust details of a simulated image;

wherein the simulation model $M_\gamma$ for the tree-structured image designed based on the small amount of expert knowledge is constructed by summarizing prior knowledge of the real tree-structured image, and is configured to generate a tree-structured simulated image and a segmentation label corresponding to the tree-structured simulated image, wherein prior knowledge of the tree-structured image comprises: morphologies of the tree, histograms of pixel or voxel intensity, background noise, and blurring effect features of a branch; and wherein the generative network model based on the morphological loss function is configured to keep an underlying segmentation label of an image unchanged, learn the style and morphological features of the real tree-structured image, and adjust detail textures and an overall pixel or voxel distribution style of the simulated image.

2. The image and segmentation label generative model according to claim 1, wherein in the first module, the simulation model for the tree-structured image designed based on a small amount of expert knowledge divides features of the tree-structured image into internal features and external features; and wherein the internal features comprise geometric image features of the branch in the image, comprising a depth of the tree, a bifurcation degree of the branch, a radius of the branch, a length of the branch, and a direction of the branch, and the external features comprise texture features of the image, an intensity distribution of the branch and a noise distribution.

3. The image and segmentation label generative model according to claim 2, wherein the internal features of the tree-structured image are configured to simulate a shape of the branch, a basic form of a neuron is represented by tree structure, and the basic form of the neuron is represented as a hierarchical nested structure with multi-level branch points and three-dimensional stretching morphological features, a branch point is formed by starting from a root node and growing along a branch, the branch point splits once and continues to grow at the branching node of each layer, so as to form a multi-level tree structure, and wherein the root node represents a beginning of the structure, nodes other than the root node are child nodes, and nodes that are not connected to other child nodes are leaf nodes, and a series of nodes with different radii are used to simulate a typical tree structure:

$$n_i = (x_i, y_i, z_i, r_i, n_j) \vee i = 1, \dots, N, j = 0, \dots, N, i \neq j, x_i, y_i, z_i, r_i \in R$$

where $n_i$ represents a single node, a position of the single node is $p_i = (x_i, y_i, z_i)$ with a radius $r_i$, a node $n_j$ represents a parent node of the node $n_i$, and a node $n_0$ represents a root node, wherein generating the simulated tree-structured image by the simulation model $M_\gamma$ requires parameters comprising a radius R of a node, a length L of the branch point, an angle of the branch point, a bifurcation degree B of a branch, and a depth T of a tree, wherein the parameters are set based on results of relevant work related to morphological statistic of the branch in the image;

the depth T of the tree represents a number of bifurcations of the tree starting from the root node, and is obtained according to a uniform distribution $U(T_{min}, T_{max})$, and a probability density of the depth T of the tree is:

$$f(t) = \begin{cases} \dfrac{1}{T_{max} - T_{min}}, & T_{min} < t < T_{max} \\ 0, & \text{other} \end{cases}$$

where $T_{max}$ and $T_{min}$ represent maximum and minimum depths of the tree, respectively;

the bifurcation degree B of the branch represents a number of bifurcated sub-branches at a bifurcation point, and is obtained based on exponential distribution:

$$f(b) = \begin{cases} \dfrac{1}{\alpha} e^{-b/\alpha}, & b > 0 \\ 0, & \text{other} \end{cases}$$

where $\alpha$ is 1;

a radius R of a node on each branch is obtained based on uniform distribution $U(R_{min}, R_{max})$, and a radius of the branch point decreases at a rate of or at a depth of each layer of the tree:

$$f(r) = \begin{cases} \dfrac{1}{R_{max} - R_{min}}, & R_{min} < r < R_{max} \\ 0, & \text{other} \end{cases}$$

$$R = R_0 \cdot \delta_r^T$$

where $R_{max}$ and $R_{min}$ represent maximum and minimum radii of the branch, respectively, and an decay rate of a radius of the branch point is $\delta_r$;

the length L of the branch point is obtained based on uniform distribution $U(L/2, 3L/2)$, and the length of the branch decreases at a rate of $\delta_l$ at the depth of each layer of the tree:

$$f(l) = \begin{cases} \dfrac{1}{3L/2 - L/2}, & \dfrac{L}{2} < r < \dfrac{3L}{2} \\ 0, & \text{other} \end{cases}$$

$$L = L_0 \cdot \delta_l^T$$

where $L_0$ represents an average length of branches obtained based on statistics, and $\delta_l$ represents a decay rate of the length of the branch;

direction of the sub-branches are determined based on a direction of a parent branch of the sub-branches, and are rotated sequentially along Z and Y axes, with rotation angles $\theta_z$ and $\theta_y$, respectively; and the angle $\theta_y$ is obtained based on uniform distribution $U(\pi/4, \pi/2)$, in such a manner that the directions of the sub-branches are substantially the same as a direction of the parent branch:

$$f(\theta) = \begin{cases} \dfrac{1}{\pi/2 - \pi/4}, & \dfrac{\pi}{4} < \theta < \dfrac{\pi}{2} \\ 0, & \text{other} \end{cases}$$

the angle $\theta_z$ is obtained based on arithmetic progression:

$$\theta_z = \left\{ \frac{k\pi}{B} \vee k = 1, \ldots, B \right\}$$

where B is the bifurcation degree of the branch, in such a manner that the sub-branches are evenly distributed around a central axis.

4. The image and segmentation label generative model according to claim 2, wherein the external features of the simulation model $M_\gamma$ for tree-structured image are used to model texture features of the image, intensity distribution of the branch and noise distribution; in the tree-structured image, a foreground is set as a branch signal, and a background is set as noise other than the branch; and the external features comprise intensity distributions of the foreground and the background, blurring effect and noise mode during imaging process;

in the tree-structured image, a pixel or voxel intensity $M_f$ and a background part $M_b$ of the branch in the tree structure are simulated based on normal distribution $M_f$ $N(\mu_f, \sigma_f)$ and $M_b$ $N(\mu_b, \sigma_b)$, respectively:

$$f(m_f) = \frac{1}{\sqrt{2\pi}\,\sigma_f} e^{\frac{-(m_f - \mu_f)^2}{2\sigma_f^2}}$$

$$f(m_b) = \frac{1}{\sqrt{2\pi}\,\sigma_b} e^{\frac{-(m_b - \mu_b)^2}{2\sigma_b^2}}$$

where $\mu_f$ and $\sigma_f$ represent mean and variance of the foreground, respectively, $\mu_b$ and $\sigma_b$ represent mean and variance of the background, respectively; and a branch in the foreground of the image is subjected to a blur process using Gaussian kernel to simulate effect of microscope imaging, and circular spots with random sizes are added at random positions in the background to simulate spotted noise signals in the image.

5. The image and segmentation label generative model according to claim 1, wherein in the second module, the underlying segmentation label of the image is kept unchanged, the style of the real tree-structured image is learnt to adjust the simulated image, inputting a simulated image z from the simulation model $M_\gamma$ to a refiner to generate a refined image R(z), and the real tree-structured image x and the refined image R(z) are fed into a discriminator configured to learn to distinguish the real tree-structured image from the refined image; and the discriminator and the refiner are optimized by following formulas;

$$\min_D \left[ E_{x p_{real}}(D(x) - 1)^2 + E_{zp}(D(R(z)))^2 \right]$$

$$m \underset{R}{\in} \left[ E_{zp}(D(R(z)) - 1)^2 + E_{zp} L_c(z, R(z)) \right]$$

where x represents sourced from a real image distribution $p_{real}$, z is sourced from a simulated image distribution p in the first stage, wherein objective functions of the refiner comprise two items: one is an adversarial objective function used by the refiner to learn the style of the real tree-structured image, and the other is $L_c$ controlling a change of a segmentation label of an input image.

6. The image and segmentation label generative model according to claim 5, with the objective function $L_c$ in the refiner to control the change of the segmentation label of the input image, controlling a similarity between a generated image and an overall distribution of an original image satisfies:

$$L_c(z, R(z)) = \alpha L(z, R(z)) + \beta L_{mp}(z, R(z))$$

where z represents the simulated image, and R(z) represents an image generated by the refiner, L represents an image similarity loss designed for external features of the image, $L_{mp}$ represents an image morphology preserving loss designed for internal features of the image, and $\alpha$ and $\beta$ represent hyperparameters for balancing each loss function.

7. The image and segmentation label generative model according to claim 6, wherein the image similarity loss is loss function in an unsupervised generative learning model, and is configured to control stability of a generative model during training and to avoid the generative model falling into a single mapping mode; and wherein a data similarity loss is as follows:

$$L_{mp}(z, R(z)) = \|z - R(z)\|_1$$

where $\|\cdot\|_1$ is L1 regularization term;

the image morphology preserving loss $L_{mp}$ maintains the underlying segmentation label of the image unchanged during the refiner transferring a style of the model, and the image morphology preserving loss $L_{mp}$ is defined as:

$$L_{mp}(z, R(z)) = \frac{|z_F \cup R(z)_F| - |z_F \cap R(z)_F|}{|z_F \cup R(z)_F|}$$

where $z_F$ represents a foreground of the simulated image, $R(z)_F$ represents a foreground of the generated image, $L_{mp}$ represents a difference in pixel or voxel values between the foregrounds of the simulated image and the generated image, and $|z_F \cup R(z)_F|$ and $|z_F \cap R(z)_F|$ represent calculated by using following two formulas:

$$|z_F \cup R(z)_F| \approx \frac{1}{2N} \sum_i^N [g(z_i) + g(R(z)_i) + |g(z_i) - g(R(z)_i)|]$$

$$|z_F \cap R(z)_F| \approx \frac{1}{2N} \sum_i^N [g(z_i) +_1 g(R(z)_i) - |g(z_i) - g(R(z)_i)|]$$

wherein $$g(x) = \frac{1}{1 + e^{-K(x-\mu)}}$$

where K represents a value for clearly distinguishing the foreground and the background of the image; and $\mu$ represents a threshold of the foreground and the background, and is automatically and statistically obtained based on predefined segmentation labels of the image:

$$\mu = \min\left\{ T \vee \int_0^T p_b(x)dx \geq 0.95 \right\}$$

where $p_b(x)$ represents a background distribution of the image; when $z_F$ and $R(z)_F$ are both foregrounds, $|z_F \cap R(z)_F|$ tends to 1, otherwise tends to 0, and when $z_F$ or $R(z)_F$ is the foreground, $|z_F \cup R(z)_F|$ tends to 1, otherwise tends to 0.

\* \* \* \* \*